United States Patent [19]

Moeller et al.

[11] 3,999,182
[45] Dec. 21, 1976

[54] PHASED ARRAY ANTENNA WITH COARSE/FINE ELECTRONIC SCANNING FOR ULTRA-LOW BEAM GRANULARITY

[75] Inventors: Alvin W. Moeller; Lucas G. Paskalakis, both of Baltimore, Md.; Wilfried G. Jäeckle, deceased, late of Birmingham, Mich.; by Margarete Gesina Jäeckle; by Volkmar Gerhard Jäeckle, heirs, both of Gottingen, Germany

[73] Assignee: The Bendix Corporation, Southfield, Mich.

[22] Filed: Feb. 6, 1975
(Under Rule 47)

[21] Appl. No.: 547,525

[52] U.S. Cl. .................. 343/100 SA; 343/108 M; 343/854
[51] Int. Cl.² ........................................ H01Q 3/26
[58] Field of Search ......... 343/108 M, 100 SA, 854

[56] References Cited
UNITED STATES PATENTS

| | | |
|---|---|---|
| 3,747,098 | 7/1973 | Kirkpatrick et al. ......... 343/100 SA |
| 3,887,926 | 6/1975 | Schwartz et al. ................. 343/854 |

*Primary Examiner*—Maynard R. Wilbur
*Assistant Examiner*—Richard E. Berger
*Attorney, Agent, or Firm*—Bruce L. Lamb; W. G. Christoforo

[57] ABSTRACT

An antenna and scanning means therefor particularly useful in an aircraft landing system operating in the microwave frequency range. The antenna is of the line phased array type which includes digitally controlled phase shifters for each of the radiating elements of the array. The beam formed by the antenna is steered by incrementing the phase shift applied at each of the array radiating elements by an amount of phase which is dependent in part upon the position of the radiating element in the array. Phase increments sufficient to shift the beam position by one coarse step (0.1°) are applied to symmetrically located radiating element pairs, pair by pair, until all elements have been incremented. The beam is thereby caused to move through one coarse step in a number of fine steps equaling the number of pairs of elements in the array. An additional feature of the scanning means is the application of phase increment to the array elements in a pseudo-random sequence.

20 Claims, 13 Drawing Figures

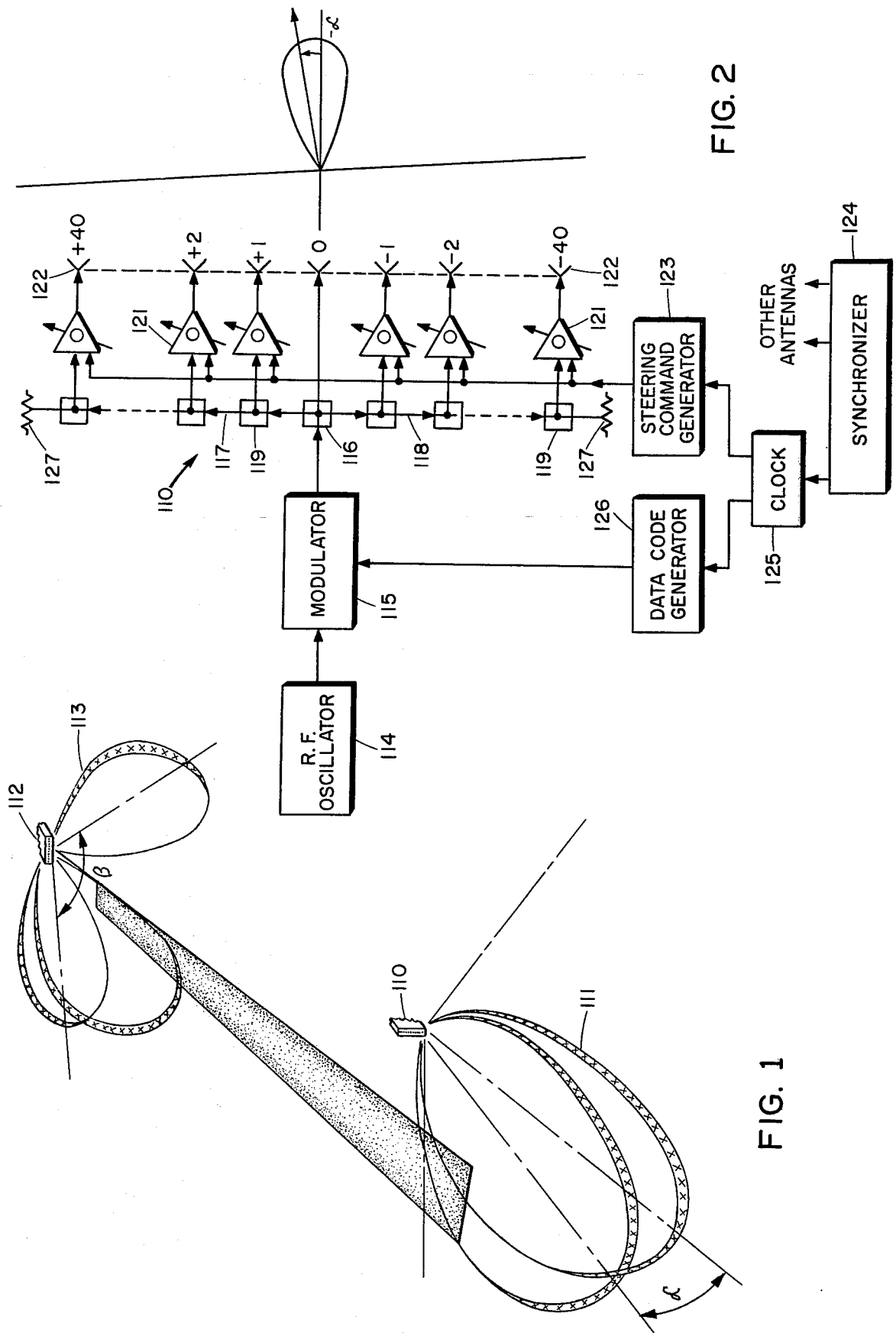

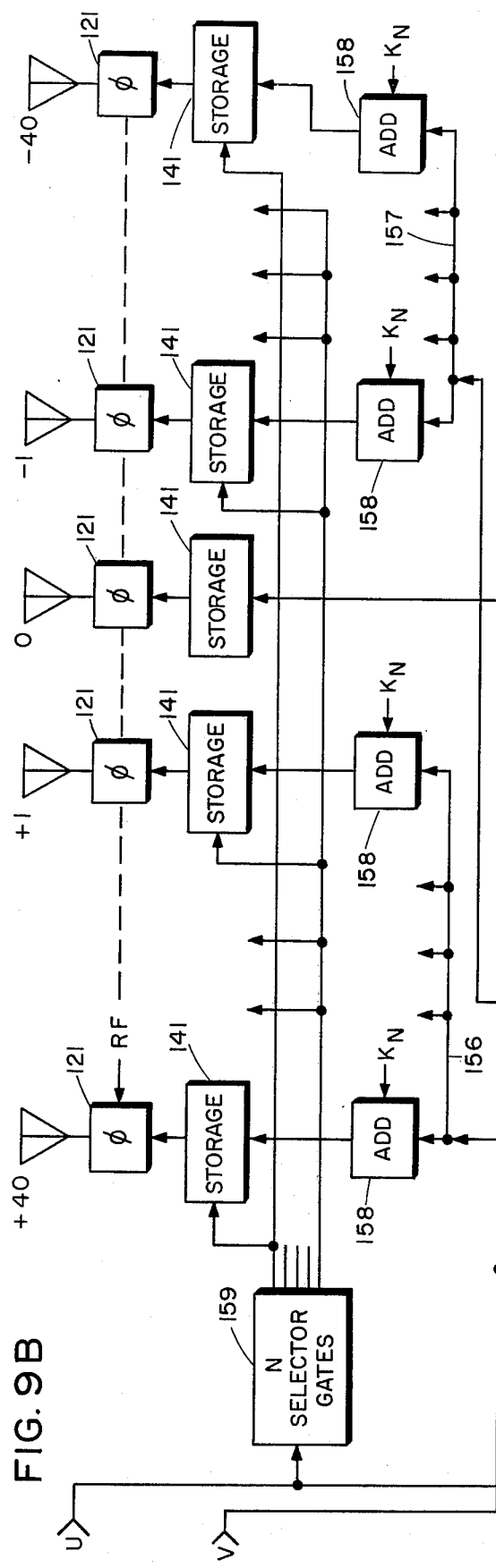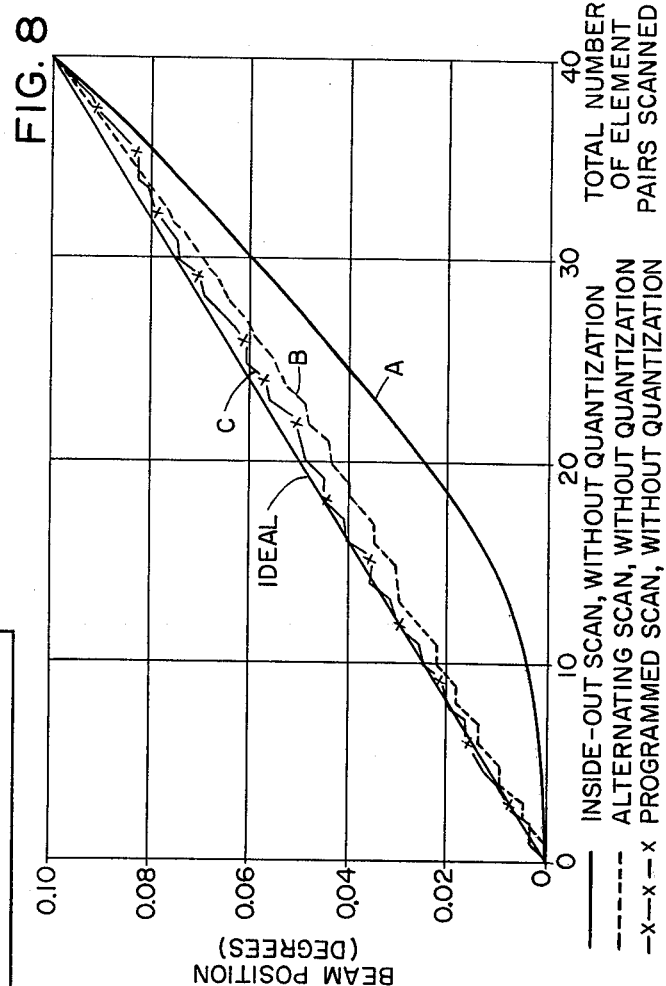

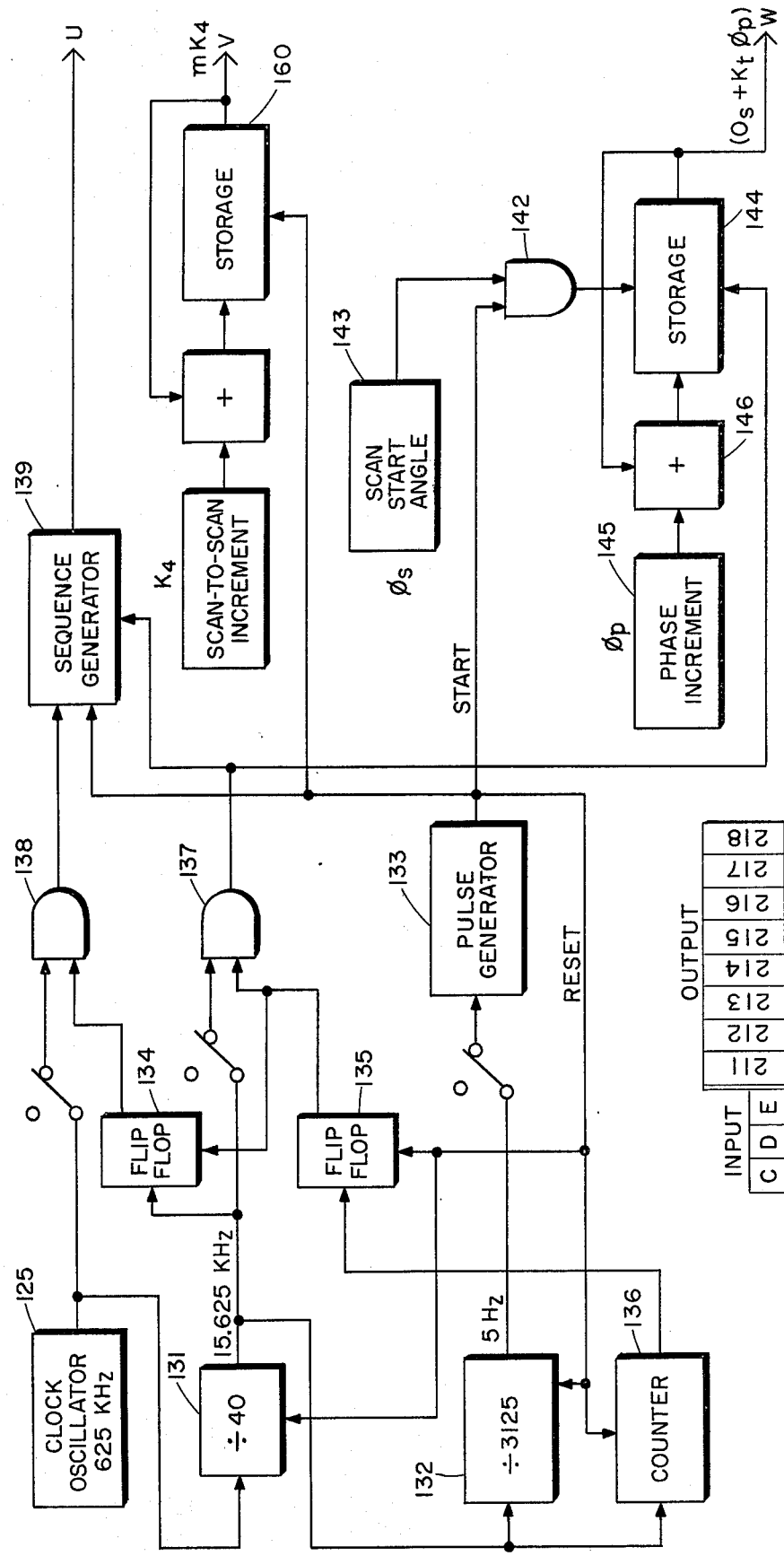

PHASED ARRAY ANTENNA WITH COARSE/FINE ELECTRONIC SCANNING FOR ULTRA-LOW BEAM GRANULARITY

The present invention relates to microwave antennas of the electronically scanned phased array type which are especially suited to use in aircraft landing systems.

The aircraft landing system in present use is the fixed beam, low approach system, more commonly known as the instrument landing system (ILS). In this system an approach path leading to touchdown at the end of an airport runway is provided by projecting in space radio beams which establish elevation (glide path) and azimuth (localizer) guidance planes. The intersection of these planes defines the single course which all blind-flying aircraft are obliged to follow for safe landing. There are several shortcomings of ILS, the foremost of which is limited capability of handling traffic since aircraft with various performance characteristics are interspersed on the single approach course.

Several different landing systems have been conceived with the object of improving accuracy and traffic flow. The system of interest herein provides two microwave beams one of which scans in azimuth, the other of which scans in elevation, and both of which contain information modulated thereon enabling an aircraft located within the volume swept by the beams to determine the ground angular coordinates of the beams at the moment they illuminate the aircraft. With knowledge of the distance of the aircraft from the beam transmitter obtained from distance measuring equipment each aircraft is then able to compute continuously an approach and landing course best suited to its situation and performance. The improvements in accuracy and traffic capacity provided by such a system need not be elaborated upon.

The methods for generating scanning microwave beams may be categorized as mechanical or electronic according to the manner of imparting scanning motion to the beam. Mechanical scanners include antennas having a fixed beam-forming reflector with an oscillating or nutating feed, a fixed feed with an oscillating reflector, or a reflector or lens with fixed feed the whole of which is movable through the desired scan angle. Electronic scanners include beam forming reflectors or lenses with a plurality of fixed feeds which are energized sequentially or they may comprise an array of relatively closely spaced radiating elements with switchable feed points or with phase shifters variable by electrical control to produce scanning motion of the beam without displacement of the antenna structure. The antenna of interest herein is of the linear phased array type which comprises a number of radiating elements disposed along a linear axis with each element connected to a feed line through a coupler and an adjustable phase shifter.

A linear phased array antenna as broadly described above is known in the art. Certain of its advantages and disadvantages are worth considering in order that the objects of the present invention may be more fully appreciated.

The linear phased array permits electronic beam scanning which eliminates constraints upon scan rates imposed by the inertia of mechanical scanners. Precise synchronization between scans of different beams in a system and between data signals containing beam pointing or other information is readily achieved. Installations are simplified since the massive foundations required by mechanical scanners to maintain alignment are eliminated. Although mechanical scanners are generally quite reliable, a failure in the drive mechanism usually means a complete loss of operation, whereas, by virtue of the redundancy of elements in a phased array, failure in the latter causes a graceful degradation but not a complete loss of performance. As would be expected, phased arrays also have some disadvantages. Complexities exist in the manufacture and assembly of elements, couplers and phase shifters and meticulous care in design is necessary to hold manufacturing costs at a level competitive with other forms of antennas.

Phasing of the array may be accomplished with phase shifters which vary the phase of currents in the array elements in continuous fashion or in discrete steps. Discrete phase shifters have certain advantages since they readily lend themselves to digital control. One disadvantage of discrete phase shifters is that they lead to an antenna from which the beam position can likewise only be varied in discrete steps. Injudicious control of the phase shifters can then cause intolerable beam granularity and side lobe levels.

It is an object of the present invention to produce a linear phased array antenna operating at microwave frequency for use in an aircraft landing system.

It is another object of the invention to provide a linear phased array antenna for use in an aircraft landing system producing a digitally controlled scanning beam with acceptable side lobe levels, minimum granulariy, distortion and transients.

A further object of the invention is to provide a linear phased array antenna utilizing discretely variable phase shifters to produce beam steering and scanning wherein corrections are provided for phase quantization errors and phase variations in elements of the array to reduce beam granularity and pointing errors.

Another object of the invention is to provide method and means for scanning a linear phased array antenna using digital phase shifters which does not impose unreasonable rates of change of state upon the phase shifters, and which reduces beam granularity and steering errors.

Another object of the invention is to provide a method and means for scanning a linear phased array antenna employing adjustable phase shifters which is conservative of the amount of power necessary to control the phase shifters.

Other objects and advantages of the invention will be recognized as a more complete understanding of its details is gained from the following description and accompanying drawings.

Briefly, the invention comprises an antenna and scanning means including a line array of radiating elements which are connected through digitally controlled phase shifters and couplers to a feed which supplies microwave carrier. The beam formed by the array is pointed in a desired direction by causing the phase shifter of each element, except the center element, to introduce a phase shift, leading or lagging according to the position of the element relative to the center, which is a multiple of the sine of the pointing angle. The multiplier for each phase shifter varies according to its distance from the center of the array.

Scanning in the coarse/fine mode is accomplished by computing a phase increment for each of the phase shifters which would shift the beam pointing direction by one coarse step (0.1°) but rather than applying that increment simultaneously to all phase shifters, it is applied to the phase shifters for symmetrically located element pairs, pair by pair, until all phase shifters have been incremented. The beam is thus caused to move smoothly through the scan angle with no apparent roughness, or granularity, in its shape. Pointing errors are reduced by incrementing the phase shifter pairs in pseudo-random sequence.

In the drawings:

FIG. 1 is a pictorial representation of an airport runway equipped with a scanning beam microwave landing system;

FIG. 2 is a block diagram showing the main elements of a linear phased array antenna with electronic scanning suitable for use in a microwave landing system;

FIG. 8 is a chart showing the beam pointing accuracy using various switching sequences in the fine scan method of the invention;

Figures 3, 11:
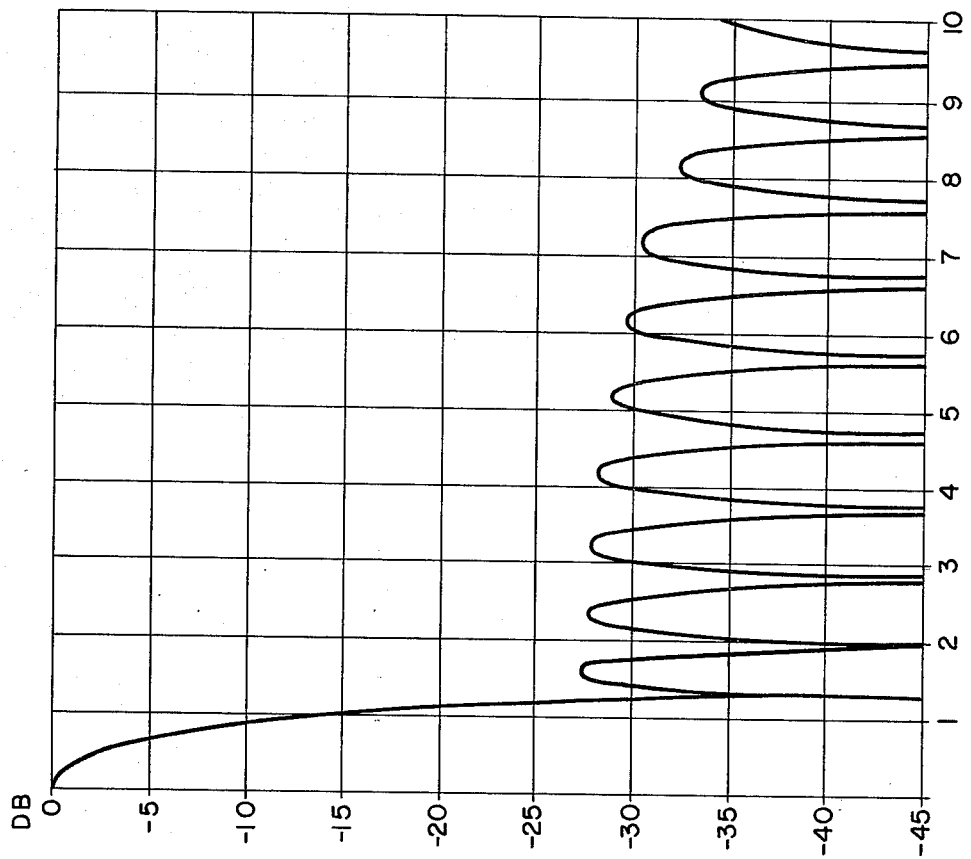
FIG. 3 is a calculated antenna pattern for a linear phased array antenna showing main lobe beamwidth and side lobe levels.
Figure 10:
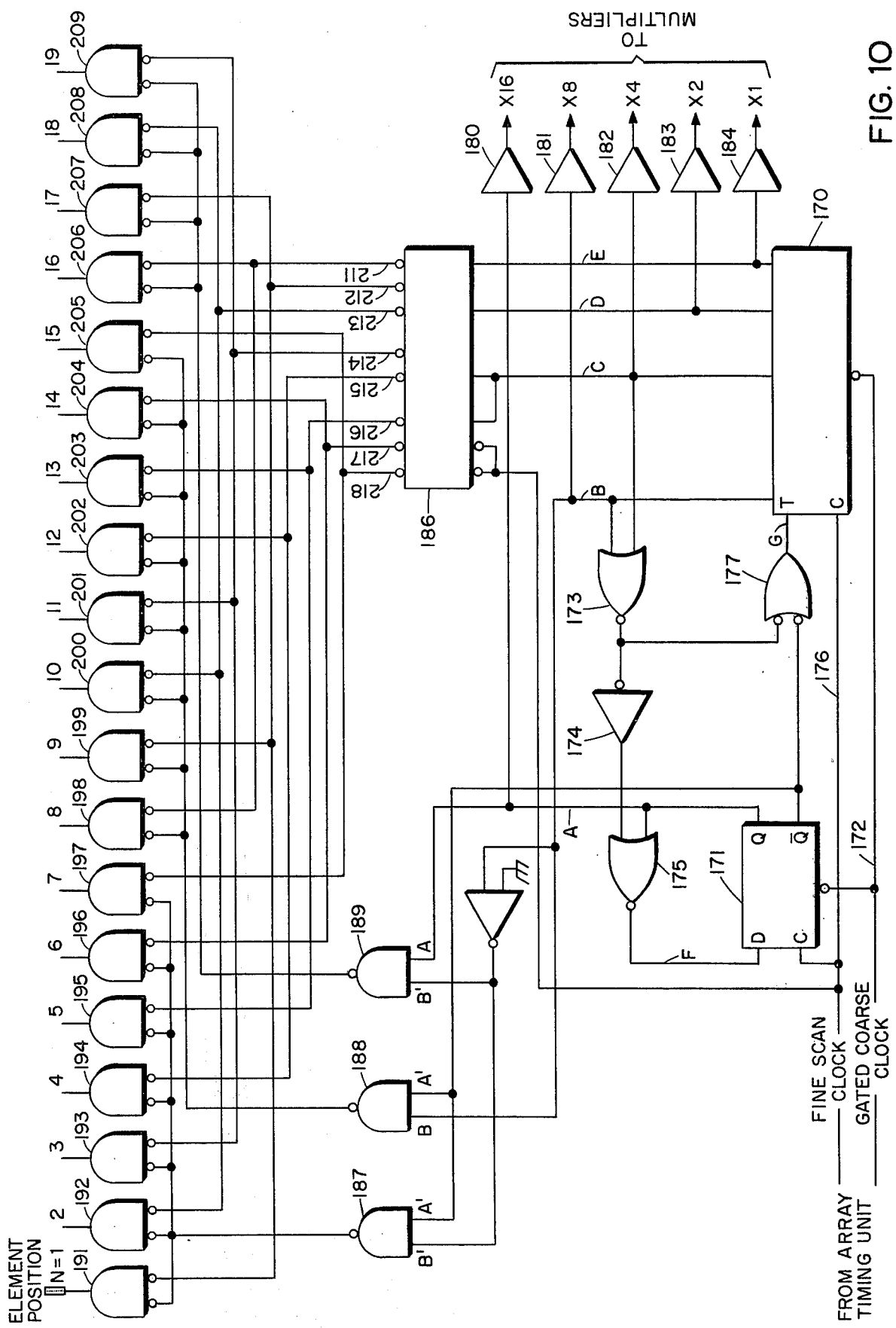

FIGS. 9A and 9B, assembled, is a block diagram showing details of the steering command generator controlling pointing and scanning of the antenna beam;

FIG. 10 is a block diagram of a sequence generator for a 19 element pair array antenna providing the pseudo-random switching sequence preferred in the fine scan method of the invention;

FIG. 11 is a truth table useful in explaining the operation of the sequence generator of FIG. 10; and FIG. 12 is a truth table useful in explaining the operation of decoders used in the sequence generator of FIG. 10.

FIG. 1 illustrates an airport equipped with a scanning beam landing system in which the present invention may be used to advantage. An antenna 110 offset from the runway center line and positioned near the runway threshold produces a beam 111 which is scanned through an elevation angle $\alpha$. Preferably the beam extends ±60° about the beam center in the horizontal plane and is 1° in width in the vertical plane. At the far end of the runway and desirably, but not necessarily, on the center line thereof, an antenna 112 produces a beam 113 which is scanned in azimuth through the angle $\beta$. Preferably beam 113 is 20° wide in the vertical plane and 1° wide in the horizontal plane. Typically, the elevation scan $\alpha$ extends between 0° and +20°, while the azimuth scan $\beta$ extends between +60° and −60° of the runway center line. Beams 111 and 113 scan in alternation five times per second each with scan times for elevation beam 111 of approximately 15 milliseconds and approximately 55 milliseconds for azimuth beam 113. It will be noted that the sum of these scan times is substantially less than the 200 millisecond scan period implied by a 5 per second scan rate. A complete airport installation includes more than the two beams here illustrated since backcourse guidance is required for missed approaches and a high resolution, short range beam is required for flare guidance. These additional beams are transmitted in sequence during the off times of beams 111 and 113. Both the elevation antenna 110 and azimuth antenna 112 may be constructed in accordance with the present invention. The azimuth and elevation antennas differ in design detail because of different beam coverage and scan requirements. The basic principles of the invention as applied to either antenna are identical and henceforth the discussion will proceed with reference to elevation antenna 110.

FIG. 2 is a functional block diagram applicable to the present invention and, in part, to other known linear phased array antennas. A microwave oscillator 114 supplies carrier nominally at a frequency of 5.19 GHz, which may contain subcarrier information imposed by modulator 115, to a coupler 116. Series feed lines 117 and 118 extend laterally from coupler 116. Additional couplers 119 are spaced along feed lines 117 and 118 where each couples a portion of the power remaining in the feed line at its location to an adjustable phase shifter 121. The output from each of the phase shifters 121 is connected to an individual radiating element 122. Elements 122 are positioned in a line array. Elevation antenna 110 comprises forty elements connected to each of the feed lines 117 and 118 and one center element for a total of eighty-one elements in the array. For identification, the center element is numbered 0, the elements connected to feed 117 are numbered +1 through +40 according to their distance from the center and those connected to feed 118 are numbered −1 through −40 according to their distance from the center. Although other feed arrangements are possible, the center, series-parallel feed shown is preferred for minimizing temperature effects and for reducing the bulk of the antenna.

The coupling factors of couplers 116, 119 are selected to provide Taylor amplitude distribution, as more fully explained hereinafter, thereby determining beamwidth and side lobe levels. Phase shifters 121 may be of a linear analog type or of a digital type, the latter being preferred herein, which introduce phase shifts in the carrier applied thereto in quantized amounts determined by a digital control signal from a steering command generator 123. A synchronizer 124 controls a clock 125 feeding the steering command generator 123 and a data code generator 126 to insure that the beam from antenna 110 will appear in proper sequence with the beam from antenna 112 and beams from other antennas of the system.

Figure 4:
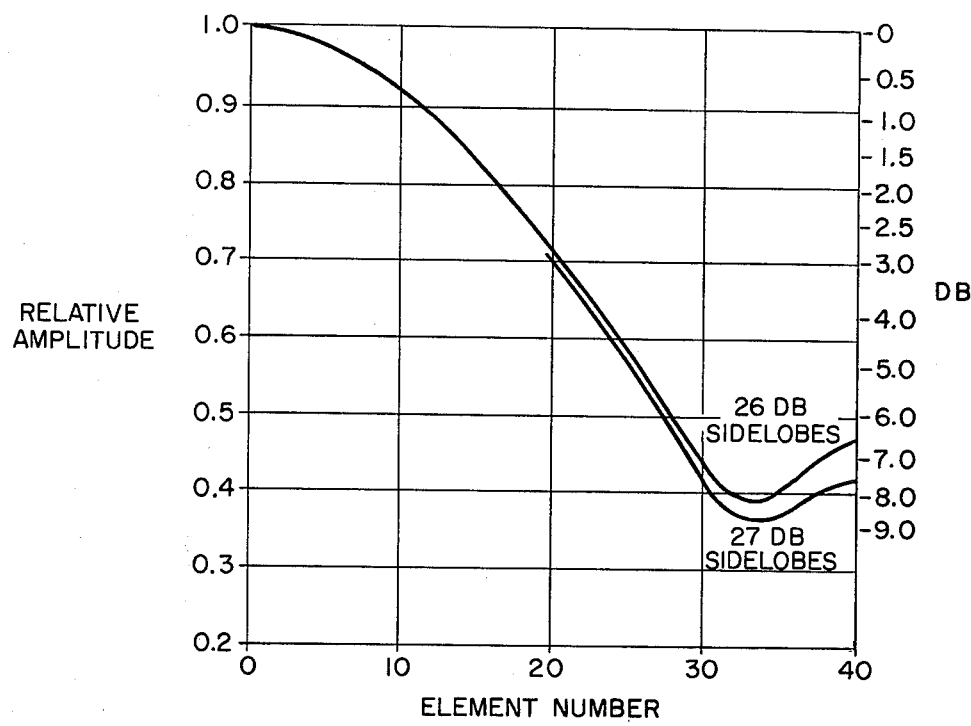
FIG. 4 is a chart showing the amplitude distribution across the aperture of an antenna necessary to produce the pattern of FIG. 3.
Figure 5:
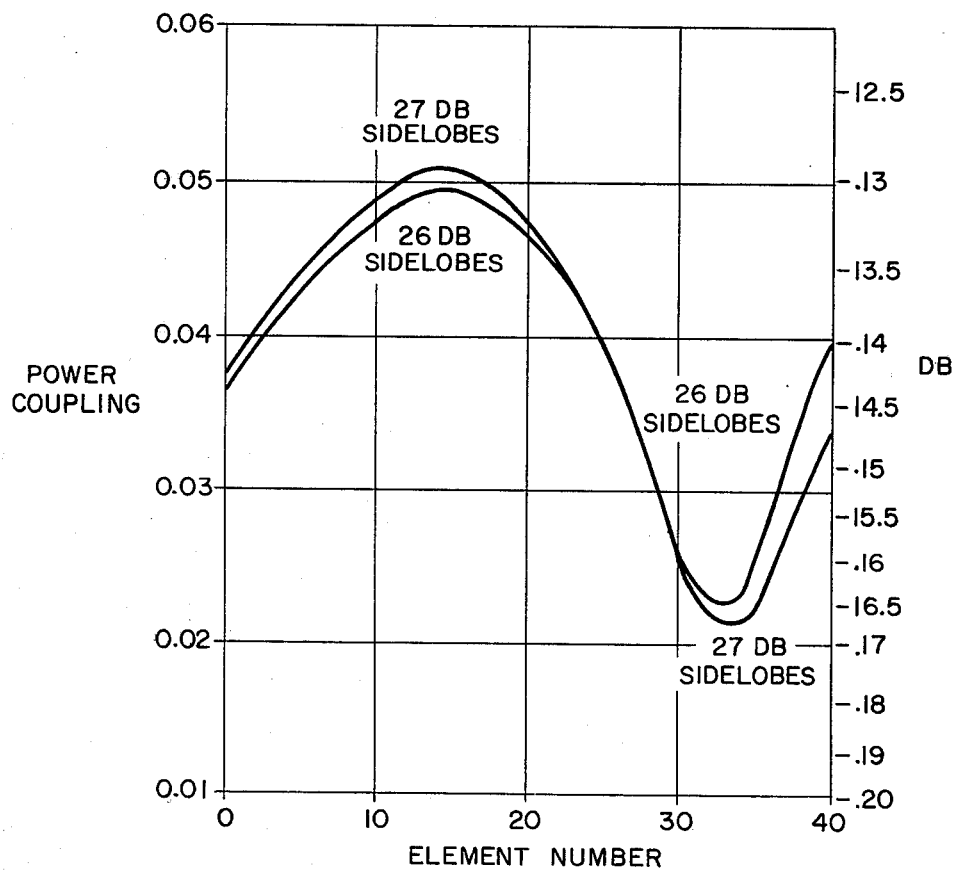
FIG. 5 is a chart showing the coupling factors at symmetrically located pairs of array elements which produce the amplitude distribution of FIG. 4.

It is possible to produce beam antenna patterns of different beamwidths and side lobe levels by tapering the amplitude distribution of currents across the aperture of the array. By following the design principles of T. T. Taylor described in "Transactions IRE", Volume A.P.-3, No. 1, January 1955, Page 16ff, the beam pattern of FIG. 3 is produced. Taylor's principles are further described in the book "Microwave Scanning Antennas", Edited by R. C. Hansen, Academic Press, 1966. The beam is 1° wide at the 3 db points and has a maximum side lobe level of −27 db. A Taylor distribution of $n=8$ was used in the design. Taylor's methods yield an amplitude distribution across the aperture as shown in FIG. 4 and values for the coupling factors for couplers 119 as shown in FIG. 5. From FIG. 5 it will be seen that coupler 116 for element 0 furnishes about 3.8% of the power in the feed to that element. The remaining power is split between feeds 117 and 118 whence it is coupled in the proportions indicated to the elements of the array. For example, at element +10 approximately 4.8% of the power remaining in feed 117 is coupled to that element. An equal amount of coupling of power from feed 118 to element -10 occurs at the location. The power remaining in feeds 117 and 118 after coupling to elements +40 and −40 is absorbed in resistive loads 127. The absorbed power amounts to 20% of the total power supplied to the array.

Steering of the beam is accomplished by adding and subtracting increments of phase to the carrier in each of the phase shifters 121 in accordance with the following well known formula:

$$\phi_N = -360 \times NS \sin\alpha \qquad 1.$$

where $\phi_N$ is the ideal phase shift (degrees) required at element P

N is the element number (positive or negative)

S is the interelement spacing (wavelengths)

$\alpha$ desired scan angle measured clockwise from the normal to the array axis.

Equation (1) may be elsewhere expressed in different forms, all of which may be readily transformed to that of equation (1). As an example of the application of equation (1), assume that it is desired to steer the beam to $\alpha = -10°$. Also assume that the interelement spacing S=½. Then $\phi_N$ the ideal phase shift which must be inserted by the phase shifter supplying element +40 is approximately −2252.8°. Integral multiples of 360° may be discarded from the value yielded by equation (1) so that the phase shift required for element +40 is −92.8°. Similarly, the phase shift required for element −40 is +92.8°. At elements +2 and −2 the phase shifts are respectively −112.6° and +112.6°. In addition, because of the delay of a wave propagating down the series feeds 117, 118, a phase shift which is constant for all scan angles, including 0°, must be added progressively to the phase shifts required for beam steering at each of the array elements except center element 0. For example, if the array elements are spaced a distance of ½ of the carrier wavelength in air, a phase front will arrive at elements ±1 with a phase λ air/λ guide 180° lagging the phase at center element 0. The phase lag increases progressively along the feed so that at elements ±40 it is 40 times that at elements ±1.

The example given above implies that phase shifters 121 are capable of producing phase shifts in continuous amount from 0°–360°. In the case of a digital phase shifter controlled by n bits, the phase shifter can produce only quantized phase shift in steps (quants) of $360°/2^n$. If n=6, the value of a quant is 5.63°.

The beam is caused to scan in two modes, coarse and fine, by computing in the coarse mode a digital number for the quantized phase shift necessary to be inserted by each of the phase shifters 121 to change the beam pointing in steps of 0.1°. In the fine mode, the phase is changed for symmetrically located pairs of phase shifters, pair by pair at clocked intervals, by an amount necessary to produce 0.1° change in the beam position. As each pair of phase shifters is switched, the beam position, ideally, changes by 0.1°/40 = 0.0025°. When all 40 pairs have been switched in this manner the beam position will have changed by one coarse step, or 0.1°, in a smoothly interpolative manner closely approximating continuous motion.

It may appear that a 5.63° value of a quant is too large an increment to provide the desired 0.0025° steps for fine scan. However, at the smallest coarse scan angle, $\alpha = 0.1°$, with the constants of the example, a phase increment greater than 5.63° is required for all array elements except elements ±1. Calculations show that an n=6 (6 bit) phase shifter leads to a maximum beam pointing error of 0.008° as a result of quantization. The errors due to quantization are averaged by adding phase equal to ½ bit (2.8125°) to the phase increments calculated at each coarse scan period.

Figure 6:
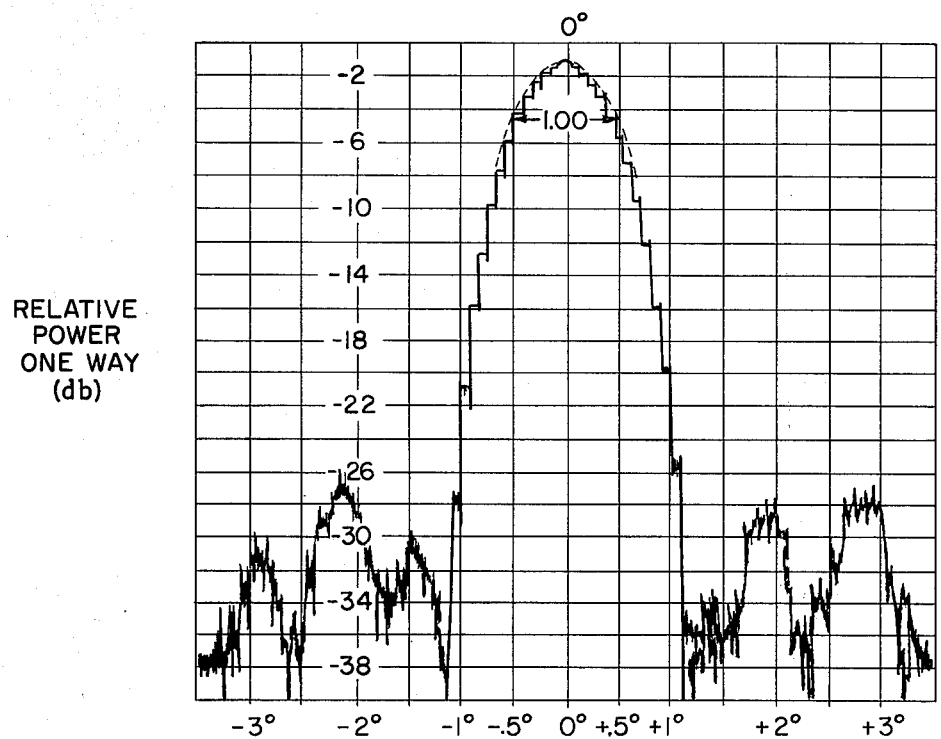
FIG. 6 is a measured antenna pattern showing beam granularity when phase shifters of all element pairs are simultaneously switched to change beam position by 0.1°.
Figure 7:
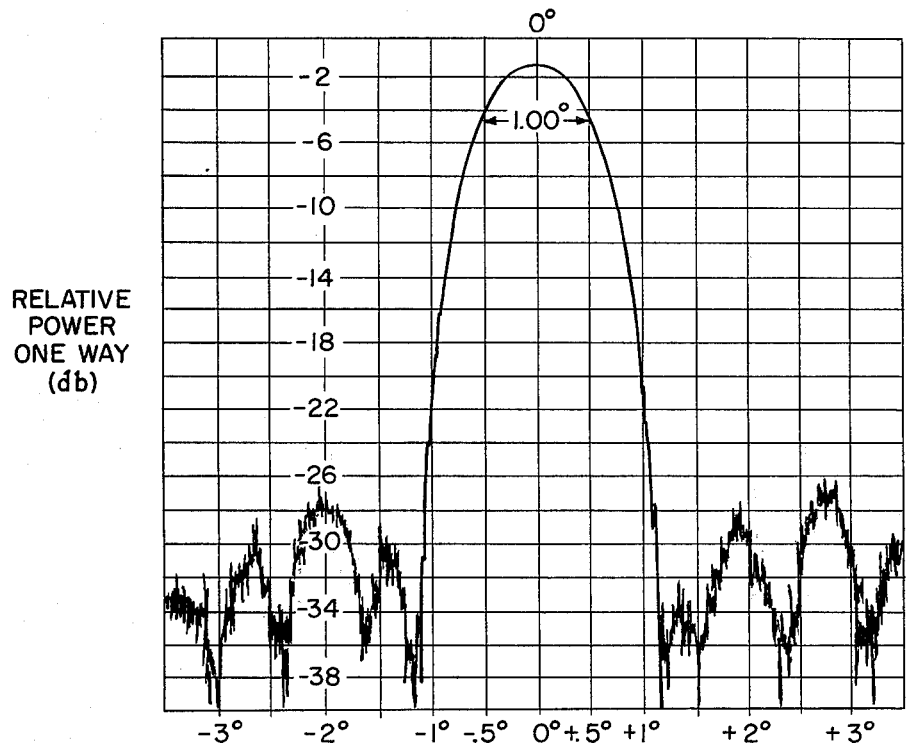
FIG. 7 is a measured beam pattern showing the reduction in granularity thereof afforded by the fine scan method of the invention.

FIGS. 6 and 7 are reproductions of measured antenna beam patterns showing the reduction in beam granularity afforded by the fine scan method of the invention. FIG. 6 illustrates the resultant pattern when all pairs of phase shifters are simultaneously switched to change beam position by 0.1°. FIG. 7 illustrates the resultant pattern when the beam position is changed 0.1° by the fine scan method of switching phase shifters pair by pair. The granularity, of roughness, of the main lobe of the beam exhibited in FIG. 6 is markedly absent in FIG. 7.

Quantization of the phase increment introduces some error in beam pointing as does the fact that in switching elements pair by pair for fine scan the phase front across the array aperture becomes non-linear. Errors caused by fine scan non-linearity are illustrated in FIG. 8 in which the phase increments of the array elements have not been quantized and in which scan is accomplished in two different switching orders. In curve A, identified as inside-out scan, array elements are switched in numerical sequence beginning with element pair 1 and proceeding toward element pair 40 at the end of the array (±1, ±2, ±3 . . . ±40). In curve B, identified as alternating scan, the element pair closest the array center is switched first, the element pair at the array ends is next switched, then the second pair of elements from the array center is switched, etc. (±1, ±40, ±2, ±39 . . . ±20). It clearly appears from FIG. 8 that alternating scan more closely approaches the ideal beam position. The reason for this improvement is that elements farther from the array center have greater effect on the beam position than do those closer to the array center. Switching elements in alternating order tends to averge these effects and move the beam position closer to the ideal.

Still further improvement in beam point accuracy is obtained by switching elements in a pseudo-random sequence. While a number of such orders, or programs, are satisfactory, the following program offers particular advantage in simplification of the beam steering logic, as later described.

±(32, 16, 8, 40, 24, 4, 36, 20, 12, 28 2, 34, 18, 10, 26, 6, 38, 22, 14, 30 1, 33, 17, 9, 25, 5, 37, 21, 13, 29 3, 35, 19, 11, 27, 7, 39, 23, 15, 31)

Curve C illustrates beam pointing accuracies obtained with programmed fine scanning without the effect of quantization.

The steering command generator 123 of FIG. 2 will now be described with reference to FIGS. 9A and 9B. Clock 125 comprises an oscillator operating nominally at a frequency of 625 KHz. The output frequency of clock 125 is divided by 40 in a divider 131 producing coarse scan timing pulses which are further divided by 3125 in divider 132 to produce start scan pulses at a 5 Hz rate. Output of divider 132 is formed into pulses in pulse generator 133 which synchronizes events by resetting dividers 131, 132, flip-flops 134, 135, counter 136, and other circuits later described.

Counter 136, beginning with the reset pulse from generator 133 sets flip-flop 135 to provide an enabling input to AND gate 137 and maintains the gate enabled until a count of 200 coarse scan pulses from divider 131 is accumulated. Flip-flop 135 sets flip-flop 134 which enables AND gate 138 for the period of output from flip-flop 135 plus one coarse clock period, thus permitting transmission of 40 cycles from clock 125 to sequence generator 139, constituting 40 steps of fine scan for each coarse scan period initiated by counter 131. Sequence generator 139, later described in detail, actuates, preferably in accordance with a pseudo-random sequence, individual storage circuits 141 each of which is connected to a single digital phase shifter 121 associated with the elements $0 \pm 40$ of the array and each of which contains in digital form the phase necessary at each of the array elements to steer the antenna beam to the desired pointing angle plus 0.1°. When actuated a storage circuit 141 transfers to an associated phase shifter 121 the phase required at that scan step. The phase shifter retains the phase value transferred until the number is changed in the next coarse scan step.

Amplifying equation (1), the phase shit $\phi_N$ required at each antenna element N for beam steering is:

$$\phi_N(t) = (\phi_R)N^2 + (\phi_S + K_t\phi_p) N + K_3\ N\ + (K_4)\ m + K_n \qquad 2.$$

where:

$\phi_N(t)$ is the phase at element position N at time $t$ after start of scan cycle
$\phi_R$ is the near field focus correction
$\phi_S$ is the phase gradient at the start angle
$\phi_p$ is the steering phase increment
$K_t$ is the number of coarse scan steps at time $t$
$K_3$ is the feed phase correction
$K_4$ is the scan to scan phase increment
$m$ is the scan cycle number
$K_N$ is the element phase correction.

The near field focus correction $\phi R$ is given by:

$$\phi_R = -(180/\lambda R)\ d^2 \qquad 3.$$

where $d$ is the element spacing
$\lambda$ is the wavelength (air)
R is the focal distance. $\phi$ and $\phi_p$ are as obtained from equation (1). $K_3$, the feed phase correction is $-360d/\lambda$ guide. $K_4 = 92.8125°$, a constant added to average phase errors caused by waveguide mismatch (90°) and ½ quant (2.8125°) for averaging quantization errors. The near field focus correction allows a receiving antenna located in the near field of the transmitting antenna to accurately monitor transmitter beam pointing and other performance factors.

Equation (2) is implemented by the following elements of FIG. 9. The start pulse from generator 133 enables AND gate 142 which loads a scan start angle selected by manual switches 143 into storage circuit 144. The tentative standards for MLS specify that the elevation beam begin scan at +20° and end scan at 0° elevation angle. The output of switch bank 143 therefore comprises the digital equivalent of $\phi_N$ as determined by equation (1) for element 1 with $\alpha=20°$. The phase increment $\phi_p$ is supplied by a manually set switch 145 to an adder 146. Each coarse scan pulse from gate 137 causes the number in storage circuit 144 to be incremented by the value set by switch 145 so that, if scan is from +20° to 0° in two hundred coarse scan steps, the two hundred coarse scan steps will have reduced the number in storage 144 to zero. A slight distortion in beam shape occurs in this process since the beam is being steered in increments of phase equaling $\phi_S$/number of coarse steps, rather than increments of $\sin\alpha$ required for undistorted steering. In one model the effect of this distortion is to broaden the beam at maximum scan angle from the desired 1.00° width to 1.07°. The beam pointing error due to this distortion is 0.00092°.

The output of storage circuit 144 ($\phi_S + K_t\phi_p$) is supplied to an N multiplier 147, the factor N being supplied by sequence generator 139, which likewise supplies N multipliers 148 and 149. The output of multiplier 147 is applied to adder 15 and, after inversion in inverter 152, to adder 153. multiplier 148 provides the product of N and $\phi_R$, the near field focus correction. $K_3$, the feed phase correction, and the output of multiplier 148 are added in adder 154 and the sum is multiplied by N in multiplier 149, providing ($\phi_R$) $N^2+K_3N$ at the output thereof to which is added $mK_4$ from storage circuit 160 in adder 155. Each start pulse from generator 133 enables storage circuit 160 to increase by an increment equal to $K_4$. The number contained in storage 160 is not cleared at the beginning of each scan cycle but is continuously incremented for each scan, resulting in a period of one hundred twenty eight scans between the appearance of equal values for $mK_4$ at the output. The output of adder 151 is therefore ($\phi_R$) $N^2 +$ ($\phi_S + K_t\phi_p+K_3$)N+$mK_4$ and that of adder 153 is ($\phi_R$) $N^2 - (\phi_S + K_t\phi_p)\ N + K_3N + mK_4$. These sums appear on line 156, for + numbered elements and on line 157 for − numbered elements. Individual adders 158 each associated with elements ±1 through ±40 of the array inserts the element phase correction $K_N$ for the element associated therewith. The values of $K_N$ are determined by calibration of the array at boresight and comprise such phase adjustment as may be necessary at each element to compensate for errors introduced by manufacturing tolerances. Depending upon the sequence selected for generator 139, for example, if the sequence is ±(32, 16, 8, etc.) as previously given, successive values for equation (2) wherein N is 32, 16, 8, etc. appear on lines 156 and 157 with each fine scan pulse from divider 131. These values are channeled to the proper element by selector gates 159 which strobe in sequence the storage circuits 141 connected to those elements. The enabled storage circuits then transfer to storage the phase values present on lines 156 and 157 and set their associated phase shifters 121 to that value. That is, the first fine scan pulse causes sequence generator 139 to enter N=32 in multipliers 147, 148 and 149 and to enable the storage circuits 141 controlling the phase shifters for elements ±32. The second fine scan pulse enters N=16 in multipliers 147–149 and enables the storage circuits for elements ±16. The process continues until the phase of all pairs of elements has been incremented once (end of first coarse scan step) whereupon a pulse from gate 137 resets sequence generator 139 and causes storage circuit 144 to increase in value by $\phi_p$, the steering phase increment. Generator 139 again runs through the sequence 32, 16, 8, etc. ending when the phase of all pairs of elements has been twice incremented (end of second coarse scan step). Again the sequence is run for the third increment of $\phi_p$, and so on, until the beam has been steered through the complete scan angle whereupon storage circuit 144 is reset to the initial value and the entire scan process is repeated.

the pseudo-random sequence in which the elements are scanned is generated by a counter-decoder multiplier arrangement in which a counter with bit capacity equal to or greater than the number of elements of the array is interconnected with multipliers which multiply by factors in reverse to the order of significance of the count and decoders which enable the memory circuits of the elements corresponding to the multiplying factor. The method of sequence generation is best explained by example.

In an array of 40 element pairs plus an unswitched center element a counter having a bit capacity of at least 40 is required. A six stage counter with a 64 bit capacity is therefore used. If the number contained by the counter is written with the least significant bit to the left, the number at the end of the first fine scan clock pulse is 100000; after the second clock pulse, 010000, the third, 110000, etc. At the end of thirty-two clock pulses the number is 000001. The most significant digit of the number is 32 in decimal notation and the least significant digit is 1. Decimal multiplying factors of values equaling the most significant bit of the counter (32), the second most significant bit (16), etc. are assigned to the counter number in descending order as the significance of the digits of the counter increases. That is,

| (32) | (16) | (8) | (4) | (2) | (1) |
|---|---|---|---|---|---|
| 1 | 1 | 1 | 1 | 1 | 1 |
| least significant bit | | | | | most significant bit |

The multiplier N, which is also the antenna element number, is the sum of the multiplying factors associated with the digits of the counter number. Whenever the sum of the multiplying factors obtained in a true binary progression exceeds the number of antenna element pairs in the array, an extra bit is added to the counter number, thereby suppressing the multiplying factor for the least significant bit of the counter number and substituting a multiplying factor associated with a bit of higher significance. For example, the counter numbers for the first two fine scan clock pulses are 100000 and 010000. N for the first two counts is therefore 32 and 16. In true binary progression the third count would be 110000 providing a multiplier of 32+16=48. But this mulltiplier is prohibited since there are only 40 pairs of elements in the array. Therefore at the third fine scan pulse an extra count is added producing the number 001000 and providing N=8.

Full description of the means for implementing the foregoing method of sequence generation for a forty element pair array becomes tedious. Instead, a sequence generator for a nineteen element pair array embodying the same method of sequence generation will be described.

Referring to FIG. 10, a 16-bit capacity sequential counter 170 and a D-type flip-flop 171 are interconnected through logic gates to provide a sequencer of potentially maximum capacity of 32 bits. However, the logic is arranged so as to prohibit the sequencer from producing the binary equivalent of any number greater than nineteen, when weights are assigned to the binary digits in reverse order of significance, since that is the number of element pairs in the array for which this sequencer was designed. A clear pulse from gate 137 (FIG. 9A) appears on line 172 at the start of a fine scan sequence which sets the output A of flip-flop 171 and outputs B, C, D and E of counter 170 to 0. Outputs B and C are combined in NOR gate 173, inverted in 174 and supplied as one input to NOR gate 175. The other input to gate 175 is output A of flip-flop 171. There is thus provided at output F of gate 175 the logic combination A'B'C' where the prime superscript indicates complement and the product notation indicates logic AND operation, i.e. F=not A AND not B AND not C.

Output F is applied to the qualifying or D input (not to be confused with output D of counter 170) of flip-flop 171. Clock pulses from gate 138 (FIG. 9A) appear on line 176. On the appearance of a clock pulse, output A of flip-flop 171 is set to the value ("1" or "0") depending on output F of gate 175. A' is available at the Q output of flip-flop 171 and is applied to an inverting input to OR gate 177. The output of gate 173 is applied to a second inverting input of gate 177 thereby providing an output G = A+B+C, where the sum notation indicates logic OR operation. Output G is applied to the qualifying input I of counter 170 which will advance in count upon the appearance of a clock pulse on line 176 only if G=1.

Outputs A, B, C, D and E are connected through buffer amplifiers 180–184 respectively to X16, X8, X4, X2 and X1 multipliers (not shown). As seen in FIG. 9B, three multipliers 147, 148 and 149 are controlled by the outputs of buffers 180–184 and each of those multipliers comprises a separate set of X16, X8, X4, X2 and X1 multipliers whose outputs are combined in an adder.

The operation of counter 170, flip-flop 171 and associated logic in determining the N sequence and controlling the multipliers is best explained by the truth table of FIG. 11. Upon the appearance of a start pulse on line 172, output A is set to 1 and outputs B-E are set to 0. Output A is 1, actuating the X16 multipliers, and outputs B-E are 0. Consequently, the first N of the sequence is 16. At the end of the first period F=0 and G=1. The second pulse on line 176 therefore sets flip-flop 171 to 0 and advances counter 170 by one bit, actuating X8 multipliers and causing the second N of the sequence to be 8.

It will be noted that outputs A-E for the first two clock pulses follow the normal binary progression of 10000 and 01000, producing the sequence 16, 8. However, the third clock pulse for normal progression would produce 11000 for outputs A-E and result in N=24 which is prohibited since the number of element pairs for this embodiment is 19. But at the end of the second clock pulse F remains 0, inhibiting flip-flop 171 and causing outputs A-E for the third clock pulse to become 00100 and N=4. At the end of the fifth clock pulse outputs A-E are 00010 and F and G are respectively 1 and 0. Flip-flop 171 is enabled and counter 170 is inhibited for the sixth clock pulse producing outputs A-E of 10010. Following along the table it will be seen that the logic prohibits the weights N assigned in reverse to the order of significance of the binary digits from assuming a number in excess of the number of pairs of elements of the array by inserting two bits of information in the counter to overstep the least significant binary digit and maintain the least significant binary digit suppressed so long as its appearance would cause N to be greater than the allowed value.

Storage circuits 141 are enabled in the desired sequence by decoding outputs A–E in a 1 of 8 decoder 186, NAND gates 187–189 and NOR (inverting input AND) gates 191-209. From FIG. 11 it will be seen that the statement AB'C'D'E' is true for N=16, the first element pair to receive phase incrementation for fine scan. Decoder 186 operates as shown in FIG. 12. When inputs C, D and E are all 0, only output 211 of decoder 186 is 0 while all other outputs 212–218 are 1. Expressed in logic form output 211 is therefore (C'D'E')'. Similarly, output 212 is (C'D'E)'; output 213 is (C'DE'), etc. Output B is inverted in inverter 220 to provide B' as an input to gates 187 and 189. Gate 189 performs the operation (A.B')'. Gates 206–209 receive the output of gate 189 on an inverting input and, respectively, outputs 211, 212, 213 and 214 also on inverting inputs. The output of gate 206 is therefore [(A.B')]' [(C'D'E')']' = AB'C'D'E' which coincides with the value of outputs A–E from FIG. 11 for N=16. Gate 206 accordingly enables the storage circuit 141 (FIG. 9B) associated with element pair 16 at the end of the first fine scan clock pulse to permit updating the data therein.

The second clock pulse in the sequence, from FIG. 11, produces outputs A'BC'D'E'. Ignoring the inversions occurring at the outputs of decoder 186 and gates 187–189 and at the inputs of gates 191–209, since a double inversion does not change the logic, A'B is found at the output of gate 188 and C'D'E' appears on decoder output 211. Gate 188 and line 211 controls gate 198 which, in turn, enables the storage circuits for element pair N=8. Control of the storage circuits for the other element pairs of the sequence is readily traced from FIGS. 10, 11 and 12 in the manner demonstrated.

A sequencer for a 40 element pair array, or for any other size of array, is constructed of circuits equivalent to those of FIG. 10 using such obvious variations of logic and number of components as may be necessary to accommodate an array larger or smaller than a 19 element pair array.

Obviously the invention may be practiced in a manner other than as specifically described without departing from the true spirit and scope of the invention.

The invention claimed is:

1. The method of producing smooth scanning motion of a microwave beam radiated by a phased array antenna having a plurality of radiating elements of variable relative phase, comprising the steps of selecting a phase increment which when multiplied by a factor dependent upon the position of each of said elements relative to a reference element of said array and applied to respective elements of said array will cause the direction of the beam formed by the array to move from a reference direction a fractional part of the total angle through which the beam is to be scanned;

applying said selected phase increment multiplied by said factor to said elements of said array, element by element, in predetermined order, until said multiplied phase increment has been applied to all elements of the array, said elements accumulating the multiplied phase increment thus applied;

again applying said selected multiplied phase increment to said elements of said array, element by element, in said predetermined order, until said multiplied phase increment has again been applied to all elements; and continuing to reapply said selected multiplied phase increment to said elements of said array, element by element, in said predetermined order until the phase increments accumulated by all elements of the array are sufficient to cause the beam formed by the array to be pointed at the maximum scan angle.

2. The method of claim 1 wherein said predetermined order is a sequence of numbers connoting the location of each said element relative to said reference element and which is pseudo-random in form.

3. The method of claim 2 wherein said predetermined order of pseudo-random form is generated by assigning decimal weights to digits of a binary sequence in reverse to the significance of said digits, generating said binary sequence, multiplying said phase increment by said decimal weights as they thus appear in pesudo-random sequence, and applying said multiplied phase increments to the element identified by the decimal weight than being used as a multiplier.

4. The method of producing smooth scanning motion of a microwave beam radiated by a phased array antenna having a plurality of antenna elements of variable relative phase, comprising the steps of (Step One) selecting a phase increment which when multiplied by factors each related to the position of an individual element relative to the axis of symmetry of the array and applied to all elements of the array will cause the antenna beam to be angularly displaced a gross amount from the beam position existing when all elements of the array are in phase;

(Step Two) multiplying said phase increment by the position factor of a particular element and altering the phase of such particular element in accordance with the product of such multiplication and simultaneously altering the phase of the element located symmetrically with said particular element in accordance with the product of said phase increment and the position factor of said symmetrical element whereby the antenna beam is angularly displaced a minor amount equal to said gross amount divided by the number of pairs of elements of the array;

(Step Three) altering the phase of additional symmetrically positioned antenna element pairs by amounts determined as in step two, each alteration of phase of pairs increasing the displacement of said beam by said minor amount until the phase of all pairs of elements has been altered and the beam is displaced by said gross amount;

(Step Four) again altering the phase of said particular element and said element in symmetry therewith by an additional amount equal to the amount of alteration of step two whereby the antenna beam is angularly displaced an amount equaling the sum of said gross amount and said minor amount;

(Step Five) again altering the phase of said additional symmetrically positioned antenna element pairs additional amounts as determined in step two until the phases of all pairs of elements have been twice altered and the beam is displaced twice said gross amount; and (Step Six) repeating said steps four and five until the accumulated gross amounts of beam displacements equal the total desired scan angle of the beam.

5. The method of claim 4 wherein steps two and three and repetitions of step three for additional alterations of phase are performed upon said elements in pseudo-random sequence.

6. The method of claim 5 wherein the pseudo-random sequence is formed by counting a series of digits in binary fashion, assigning a decimal weight to each binary digit, said decimal weight being largest for the least significant bit of said binary count and smallest for the most significant bit thereof, the positions of said elements being identified by said decimal weights, said position factors being related to said decimal weights, and altering the phase of said elements in the order of the appearance of said decimal weights as said binary count progesses.

7. An electronically scanned linear phased array antenna, comprising
  a linear array of radiating elements cooperating when excited with energy to form a beam of energy;
  adjustable means for shifting the phase of energy radiated by certain of said elements to alter the pointing of said beam of energy radiated by said array;
  means for feeding energy to each of said elements of said array;
  means providing control signals for each of said phase shift means; said control signals corresponding to a fixed incremental amount of phase shift, the value of said increment at each said phase shifter being that necessary to change the pointing of said beam by a proportion of the total angle through which said beam scans;
  means associated with each said phase shifter for accumulating and storing phase shift increments represented by said control signals and for adjusting said phase shifters to provide phase shift in the amount of the total of said increments;
  sequencing means for said control means causing said control means to furnish said phase shift increment signals to said accumulation and storage means for each said element, element by element, in a routine of predetermined order, said sequencer repeating said routine until the total of said phase increments contained by said storage means corresponds to the total scan angle of said beam.

8. An antenna as claimed in claim 7 wherein said means providing control signals is arranged to provide control signals corresponding to incremental amounts of leading phase relative to the phase of a reference one of said elements for elements positioned to one side of said reference element and to provide control signals corresponding to lagging phase for elements positioned to the opposite side of said reference element.

9. An antenna as claimed in claim 8 wherein said reference element lies on the axis of symmetry of said array.

10. An antenna as claimed in claim 9 wherein said sequencer provides said routine of predetermined order for said storage means associated with elements receiving leading phase increments and simultaneously provides a routine of identical predetermined order for said storage means associated with elements lagging phase increments whereby phase adjustments are accomplished simultaneously for pairs of elements each of which is located symmetrically with respect to said reference element.

11. An antenna as claimed in claim 8 wherein said predetermined order of said sequencer routine is pseudo-random in form.

12. An electronically scanned linear phased array antenna, comprising
  a linear array of radiating elements;
  means for feeding energy to a reference element of said array, said reference element lying on the axis of symmetry of said array;
  a pair of feed lines extending parallel to said array on opposite sides of the axis of symmetry thereof,
  means coupling elements of said array lying to one side of said reference element to one of said feed lines and coupling elements of said array lying to the other side of said reference element to the other of said feed lines;
  adjustable phase shift means for each of the elements of said array lying off the axis of symmetry thereof
  means providing a phase increment signal;
  means for multiplying said phase increment signal by a factor related to the position of an element of said array relative to said reference element;
  storage and control means for each of said phase shift means; and
  sequencing means controlling said multiplying means and applying the output thereof in predetermined order to pairs of said storage and control means, said pairs being for control of the phase shifters associated with elements positioned symmetrically with respect to said reference element, the factor of said multiplying means being correlated with the position of that pair of elements, the associated storage and control means of which are at the time receiving said multiplier output.

13. An antenna as claimed in claim 12 wherein said sequencer includes
  a source of clock pulses;
  a binary counter for counting said clock pulses;
  means controlled by said counter providing decimal weights associated with each bit of output from said counter, said weights descending in value as the significance of bits from said counter increases; and
  means combining said decimal weights for operating said storage and control means, each said storage and control means, its one of said phase shift means and associated one of said elements being identified by a decimal number, said decimal number being constituted by said combined decimal weights.

14. An antenna as claimed in claim 13 wherein said multiplying means receives said decimal weights for forming said factor related to the position of an element.

15. An antenna as claimed in claim 13 wherein said sequencer includes additionally,
  means for advancing the count of said counter whenever the normal binary progression count would otherwise result in said decimal number produced by combining said decimal weights being in excess of the number of elements of said array.

16. An electronically scanned linear phased array antenna comprising
  an array of N in number radiating elements disposed linearly from a reference element, said elements being identified by integral numbers $n=1$ through $n=N$ in the order of their distance along said array from said reference element;
  an adjustable phase shifter for each of said elements;

means for feeding energy through said phase shifters to be radiated by said elements as a beam;

means providing a phase increment to be used in controlling said phase shifters;

computation means for multiplying said phase increment signal by a factor of said n and for adding phase constants to the product of said multiplication to provide a signal for control of the phase shifter for the one of said elements identified by said $n$; and sequencing means controlling said computation means and the distribution of output thereof to said phase shifters, said sequencing means varying in predetermined order the value of said $n$ through the range $n=1$ to $n=N$ for said computation means and simultaneously applying the output of said computation means to the phase shifter for the one of said elements identified by said $n$ then being used in said computation means.

17. An antenna as claimed in claim 16 with additionally means associated with each of said phase shifters for retaining the output of said computation means applied to each said phase shifter during the completion of a sequence of said predetermined order by said sequencer and for accumulating and retaining for each said phase shifter additional outputs of said computation means provided during subsequent repetitions of said predetermined order by said sequencer.

18. An antenna as claimed in claim 17 wherein said sequencing means includes a source of clock pulses;

a counter for counting said clock pulses in binary form;

means for applying decimal weights to each digit of the binary output of said counter with the greatest of said weights being applied to the least significant digit and the least of said weights being applied to the most significant digit of said binary output; and means for combining said decimal weights to produce said number $n$.

19. An antenna as claimed in claim 18 wherein said sequencing means includes means for increasing the output of said counter to a higher binary number whenever normal binary progression would yield in combining said decimal weights a number n greater than said number N of radiating elements.

20. An antenna as claimed in claim 17 wherein said array comprises N number of radiating elements disposed linearly to one side of said reference element in a direction identified as positive and an equal number N of radiating elements disposed linearly to the other side of said reference element in a direction identified as negative, said numbers $n$ being positive and negative to identify elements positioned symmetrically with respect to said reference element in said positive and negative directions and wherein said computation means preserves the algebraic sense of said positive and negative numbers $n$ to cause equal and opposite phase shifts in the energy radiated by symmetrically positioned elements.

* * * * *